May 8, 1945.　　　　C. H. SUYDAM　　　　2,375,260
DEVICE FOR TESTING CRYSTALS
Filed July 16, 1943
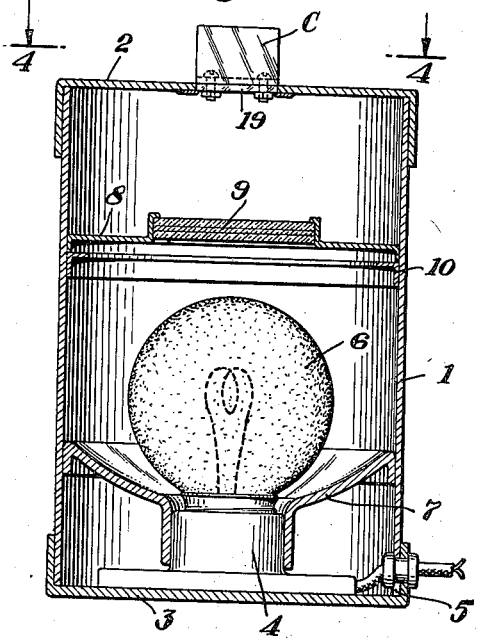
Fig. 1.
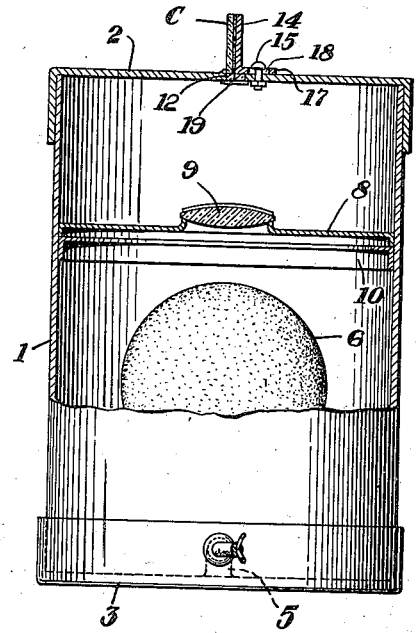
Fig. 2.
Fig. 3.
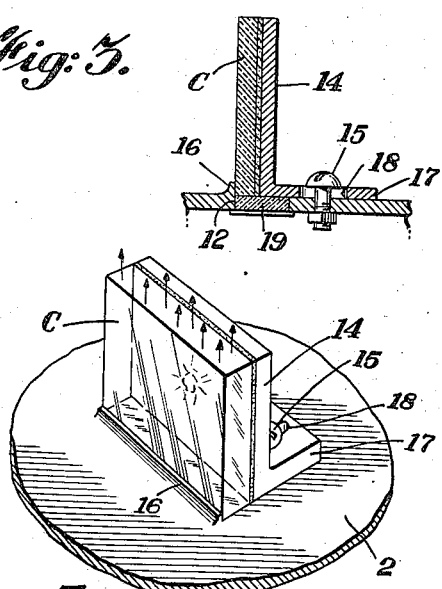
Fig. 5.
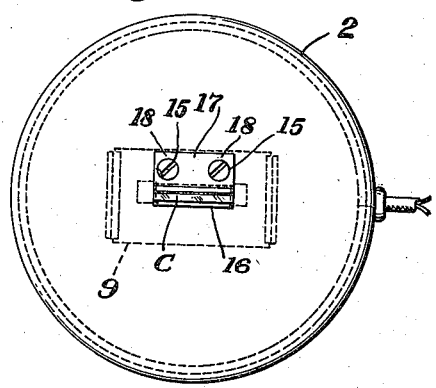
Fig. 4.
INVENTOR.
CLINTON H. SUYDAM
BY
ATTORNEY Patented May 8, 1945

2,375,260

UNITED STATES PATENT OFFICE 2,375,260

DEVICE FOR TESTING CRYSTALS

Clinton H. Suydam, Orange, N. J., assignor to Federal Telephone and Radio Corporation, New York, N. Y., a corporation of Delaware Application July 16, 1943, Serial No. 495,041

1 Claim. (Cl. 88—14)

The present invention relates to improvements in the optical testing and inspection of piezoelectric crystal elements such as employed, for example, in the frequency control of oscillation generators. At one stage in the manufacture of crystal elements it becomes necessary to inspect said elements to determine whether or not they contain any flaws such as minor cracks, veils, needles, etc. These flaws are usually observable only when the crystal has been fine ground and is substantially ready for finishing.

To this end the present invention comprises a simplified device to aid in performing the inspection operation. The improved device is designed materially to facilitate the test operation under proper control of lighting for uniformity of test conditions and in a manner contributing to high efficiency in the detection of flaws, either internal, or on the surface, of the crystal blanks. To this end the improved arrangement provides for the testing of the crystals by the projection or the directing of light rays to pass through the edge of the crystals, or in a direction parallel to the plane of the faces of the crystals, or sides of enlarged surface area, whereby the presence of internal or surface flaws of varied nature will by refraction of the light rays be readily visible and easily detected by an observer viewing the face of the crystal. It further contemplates the employment of a reflecting or mirror backing for the crystal blanks as they are being tested, whereby light rays which are directed by refraction away from the observer are by reflection from the mirror surface returned through the crystal where they are visible to the observer.

The foregoing and other features and advantages of the present improvements will be more fully understood by reference to the accompanying drawing wherein like reference characters are applied to the corresponding parts in the several views.

In the drawing—

Fig. 1 is a central, vertical sectional view of the testing device embodying the features of the invention.

Fig. 2 is a view in similar section taken at right angles to that of Fig. 1.

Fig. 3 is an enlarged view of a portion of Fig. 2.

Fig. 4 is a plan view of the device, and

Fig. 5 is a perspective view showing the manner of crystal support and the projection of light rays therethrough.

In the preferred embodiment of the device for testing the crystal blanks, provision is made for directing light rays through the edge of the crystal body, or in a direction parallel to the faces of the blank and with the desired protection from interfering light. For this purpose a lamp box is employed having a test slot or opening over which the blank to be tested is positioned for the passage of the light therethrough. The lamp box may consist of the casing or wall member 1 having its ends closed by the upper flanged cover plate 2, and the bottom flanged base plate 3. Mounted on the base plate is a lamp socket 4 with the leads extending laterally through the flange, a slot 5 in the casing 1 permitting assembling thereof. The lamp 6 is screwed to the socket and a suitable reflector 7 is slip fitted on the socket and slidably fitted within the casing for the upward reflection of the light. Supported in a suitable opening of a partitioning lens support 8 is a lens 9; the partition being supported by an angular supporting ring 10 frictionally engaging the inner surface of the casing. The lens as shown is centrally positioned above the lamp and is of cylindrical convex form for concentrating the light rays in a vertical bank or beam. The cover plate 2 is formed with a slot or elongated opening 12 for the vertical passage of the light and associated with the opening there is provided an adjustable backing support for the crystal to be test inspected.

The backing support 14, as shown in Fig. 5, has a flanged extension 17 by which the support may be adjustably mounted on the cover plate 2. By means of screws 15 passing through slots 18 in the flange the backing support may be firmly held in the desired position. The position of the support is determined by the thickness of the crystal blanks to be tested. These blanks are mounted on edge over the light slot 12 and against the backing support, as illustrated in Figs. 3 and 5. A small integral flange 16 is upturned from the plate 2 to position the front face of the crystal. Fitted within the light slot 12 is a glass insert 19. The purpose of this glass insert is to prevent the crystal blank from falling through the light slot in the cover plate. The width of the slot opening, and also of the glass insert, is such that various widths of crystal blanks may be tested. One edge of the crystal is always placed adjacent the flange 16 and the backing member moved forward until the crystal blank has a smooth sliding fit between said flange and support.

In the operation of testing, the crystal indicated at C is mounted in position against the backing support 14, and directly over the light slot 12, whereby, as indicated in Fig. 5, the light rays pass vertically therethrough. As will be readily understood, in the absence of flaws, the exposed flat face of the crystal will show a luminescence of uniform value for the full area. The presence of a flaw, however, such as, for example, the type known as a needle will by the refraction of the light rays, cause readily observed light spots to appear on the viewed surface, thereby indicating the presence of the flaw.

As a further feature and aid in the testing operation, the forward or backing face of the support 14 is silvered or otherwise given a reflecting surface, thereby to facilitate flaw indications by reflecting light rays toward the observer in the event that the flaw has refracted most of the light away from the observer. This contributes to the rapidity of the testing, particularly as related to thicker crystals, by avoiding the necessity of reverse position testing which might otherwise be required.

Having described my invention, I claim:

A device for the optical testing of piezo-electric crystals for flaws including a light-tight box provided with a light slot for the uni-directional projection of light therefrom, a light source within the box, a backing support associated with said slot for supporting a crystal on edge over said slot and a mirror integral with the backing surface of said support whereby light rays pass edgewise through said crystal to render the flaws visible by refraction and rays refracted toward the mirror are reflected toward the observer.

CLINTON H. SUYDAM.